Aug. 25, 1925.
B. G. LAMME
1,551,316
PHASE BALANCER
Filed Jan. 24, 1921
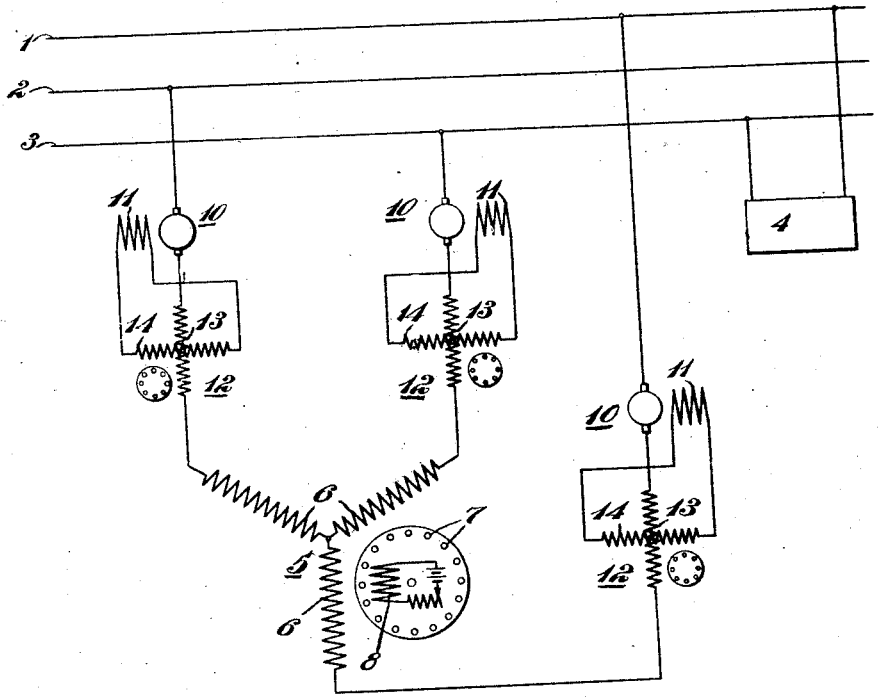
WITNESSES:
J. P. Wurmb.
J. R. Langley
INVENTOR
Benjamin G. Lamme.
BY
Wesley G. Carr
ATTORNEY Patented Aug. 25, 1925.

1,551,316

UNITED STATES PATENT OFFICE.

BENJAMIN G. LAMME, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE BALANCER.

Application filed January 24, 1921. Serial No. 439,413.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Phase Balancers, of which the following is a specification.

My invention relates to phase balancers, and particularly to polyphase dynamo-electric machines which are adapted for shunt connection to an unbalanced polyphase line.

In many polyphase transmission systems, such as those supplying single-phase railways, where single-phase power may be taken from any or all phases of the polyphase system or generator, it is desirable to have a phase-balancing machine or apparatus which will draw energy from one phase and supply energy to another phase in order to maintain practically balanced current or voltage conditions in the polyphase system.

It is well known that a polyphase motor, of either the synchronous or the induction type, when connected across an unbalanced polyphase system, will tend to exert a balancing action thereon. The perfection of the balancing action is dependent upon the amount of reactance in the polyphase motor circuits, the balancing action being the greater the lower such reactance. If a balancing motor of zero reactance were connected across a polyphase system which supplies a single-phase load, such motor would assume all of the unbalance, and the supply system as a whole would remain balanced.

It is, therefore, an object of my invention to produce a polyphase motor which has extremely low effective reactance.

A more specific object of my invention is to neutralize the reactance in each phase of the balancer machine by means of a single-phase commutator generator, which is so excited as to produce an electromotive force substantially proportional to the current and having the correct phase-angle with respect thereto.

The single figure of the drawing is a diagrammatic view of apparatus and circuits embodying one form of my invention.

Referring to the drawing for a more complete understanding of the invention, I show, at 1, 2, 3, an unbalanced polyphase transmission system, the condition of unbalance being indicated by the single-phase load 4. The balancer machine 5 consists of a primary member having a polyphase winding 6 and a secondary member having a good damper winding 7. If desired, a unidirectional-current-exciting winding 8 may be placed on the secondary member.

It is well-known that an unbalanced polyphase system may be resolved into two balanced-component systems having different phase-sequences. A balancer machine of the class just described, by virtue of its good damper windings, may be made to offer very low impedance to currents of negative phase-sequence. However, on account of the imperfect magnetic coupling between the primary and secondary members of the balancing machine, there will be a certain reactive impedance to said currents of negative phase-sequence, in addition to the impedance resulting from the ohmic resistance of the windings. All that is necessary to accomplish the desired result, therefore, is to introduce an electromotive force which is displaced practically 90° with respect to the current but in the opposite direction to the reactance voltage-drop.

It is well known that a series commutator-type single-phase machine will generate an electromotive force which is practically in phase with its field-exciting current. Therefore, such a machine, if connected in series with one of the phases of the polyphase motor, would generate an electromotive force which varies practically in proportion to the current in said phase. However, the generated electromotive force would be substantially in phase with the current, whereas, to neutralize the reactance voltage, it should be at approximately a 90° phase-angle thereto.

According to my invention, therefore, I provide, in series with each phase of the primary winding of the phase balancer machine, the commutator of a separately excited single-phase, commutator-type machine 10. The exciting winding 11 of each machine is energized by current of substantially 90° phase-displacement with respect to the current in the corresponding phase of the balancer substantially proportional thereto.

One means for supplying the exciting current is indicated in the drawing as comprising a small induction generator 12 for each phase, said induction generator having a primary winding 13, connected in series with the phase-conductor, and a tertiary winding 14, connected to energize the exciting winding 11 of the commutator machine. By thus supplying exciting current shifted 90°, the electromotive force of the commutator machine is also shifted 90° with respect to the current in the corresponding phase-conductor.

A small induction machine, used as a phase splitter in the above described arrangement, is equivalent to a series transformer, its tertiary electromotive force rising and falling with the main current. By connecting the commutator machine in the proper direction, its electromotive force may be made to oppose the reactive electromotive force of the corresponding phase of the balancer.

If it is found desirable, the magnetic circuits of either the commutator machine or the small induction machine may be so designed as to become saturated under conditions of excessive overload, in order that the corrective effect of the commutator machine may be made to apply only within certain predetermined ranges of load. For excessive overloads, the reactance of the phase balancer would not be decreased materially by this arrangement, and excessive currents would thus be prevented.

The choice of a small induction machine, to accomplish the desired phase-splitting function, is only made to illustrate the principle of my invention. Other methods of shifting the exciting current 90° are possible, and it is to be understood that my invention covers any equivalent phase-splitting means.

I desire it to be understood also that my invention is not limited to an exact 90° shift between the primary and tertiary windings of the small induction machine, as other than 90° positions may be employed, in order to exactly overcome the reactance voltages of the main machine, under any given conditions.

While I have shown my invention in the preferred form, it is to be understood that it is susceptible of various modifications by those skilled in the art, without departing from the spirit and scope thereof, as set forth in the appended claims.

I claim as my invention:

1. The combination with a set of polyphase line conductors subject to unbalanced conditions, of a phase balancer, leads for connecting said phase balancer in shunt across said line conductors, and an auxiliary single-phase source adapted to be connected in series with one phase of said leads for neutralizing the internal-impedance electromotive force of said balancer in said phase.

2. The combination with a set of polyphase line conductors subject to unbalanced conditions, of a phase balancer, leads for connecting said phase balancer in shunt across said line conductors, and an independent auxiliary means connected in series with each of said leads, each of said auxiliary means being adjusted to neutralize the internal-impedance electromotive force of the balancer in its own phase.

3. The combination with a shunt phase balancer, of means connected in series therewith for neutralizing the internal-impedance electromotive forces thereof, said means being so designed that its neutralizing action is curtailed by reason of magnetic saturation during excessive overloads.

4. In a phase-balancing system, the combination with a dynamo-electric machine having a polyphase primary winding adapted to be connected in shunt across an unbalanced polyphase line, said machine also having a good damper winding for rotation at approximately synchronous speed with respect to said primary winding, of means connected in series with certain of the phase-windings of said machine for neutralizing the internal impedances thereof, each of said means comprising a single-phase commutator generator having its commutator-winding connected in series with the corresponding phase-winding of the balancer and having a separately excited field winding, and means for exciting said field winding by a current displaced with respect to the current flowing in the armature-winding and proportional thereto.

5. In a phase-balancing system, the combination with a dynamo-electric machine having a polyphase primary winding adapted to be connected in shunt across an unbalanced polyphase line, said machine also having a good damper winding for rotation at approximately synchronous speed with respect to said primary winding, of means connected in series with certain of the phase-windings of said machine for neutralizing the internal impedances thereof, each of said means comprising a single-phase commutator generator having its commutator-winding connected in series with the corresponding phase-winding of the balancer and having a separately excited field winding, and means for exciting said field winding with a current displaced approximately 90° with respect to the current flowing in the armature-winding and proportional thereto.

6. In a phase-balancing system, the combination with a dynamo-electric machine having a polyphase primary winding adapted to be connected in shunt across an unbalanced polyphase line, said machine also having a good damper winding for rotation at approximately synchronous speed with respect to said primary winding, of means connected in series with certain of the phase-windings of said machine for neutralizing the internal impedances thereof, each of said means comprising a single-phase commutator generator having its commutator-winding connected in series with the corresponding phase-winding of the balancer and having a separately excited field winding, and an auxiliary induction machine having a primary winding connected in series with said commutator winding and having a tertiary winding displaced with respect to said primary winding and connected to energize the exciting winding of said commutator machine.

7. The combination with a shunt phase balancer, of independent auxiliary means connected in series with the respective primary phase-conductors thereof to neutralize the internal-impedance electromotive forces of the balancer in the respective phases, each of said auxiliary means comprising a single-phase, commutator-type machine having a commutator-winding and a field exciting winding, and phase-modifying means connected in series with said commutator-winding and energizing said field-exciting winding by current displaced with respect to the current in said commutator-winding and substantially proportional thereto.

8. The combination with an alternating-current dynamo-electric machine, of dynamo-electric booster means connected in series therewith and inherently operating to substantially neutralize the internal-impedance electromotive forces thereof during normal-load operation, said means being so designed that its neutralizing action is curtailed by reason of magnetic saturation during excessive overloads.

9. The combination with an inductive reactance device, of dynamo-electric booster means connected in series therewith and inherently operating to substantially neutralize the inductive reactance electromotive forces thereof during normal operation, said means being so designed that its neutralizing action is curtailed by reason of magnetic saturation during excessive current flow.

10. The combination with a single-phase circuit, of a series booster for neutralizing the impedance of a given portion of said circuit, said series booster having a commutator winding connected in series with said circuit and a separately excited field winding, and an auxiliary dynamo-electric machine operating as a phase splitter, said auxiliary machine having a primary winding connected in series-circuit relation with said single-phase circuit and having a tertiary winding connected to said field winding and disposed in such angular relation to said primary winding that the currents delivered to said field winding have the proper phase and magnitude to cause said commutator machine to overcome both the ohmic and reactive impedance of said portion of the single-phase circuit.

In testimony whereof, I have hereunto subscribed my name this 31st day of December, 1920.

BENJAMIN G. LAMME.